Figure 1:
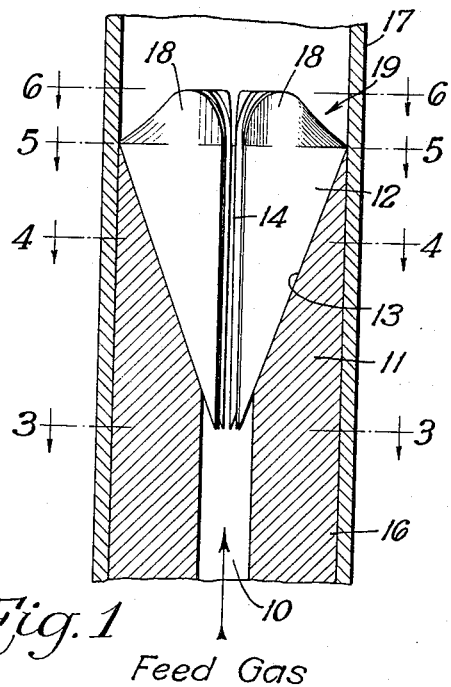

Jan. 25, 1955

R. E. PROBST 2,700,595

FLUID INLET FOR SUSPENDED SOLIDS CONTACTING

Filed Dec. 7, 1950

Feed Gas

INVENTOR.
Reimer E. Probst
BY
Everett A. Johnson
ATTORNEY

United States Patent Office 2,700,595
Patented Jan. 25, 1955

2,700,595

FLUID INLET FOR SUSPENDED SOLIDS CONTACTING

Reimer E. Probst, Park Forest, Ill., assignor to Standard Oil Company, Chicago, Ill., a corporation of Indiana Application December 7, 1950, Serial No. 199,690

2 Claims. (Cl. 23—288)

This invention relates to method and means for providing contact between gasiform fluids and finely divided solid materials. More particularly the invention relates to supplying the gasiform fluid at a low point to a dense turbulent suspended mass of finely divided solids.

It has long been recognized that a gas can be passed upwardly through a bed of finely divided solid materials to effect fluidization thereof and to provide contact of the gasiform fluids and the finely divided solids. However, it has been observed that the solid particles have a tendency to settle out in any relatively quiescent zones and that efficient contacting has been difficult because of channeling of the gasiform fluid through the mass of solids.

It has heretofore been proposed to minimize these defects by employing a grid or perforated plate for supporting the finely divided solids and for introducnig the gasiform fluid at spaced points across the flow area of the reaction vessel. Nevertheless, fluidized beds of catalyst contactors wherein the gasiform fluids are so introduced have suffered from a number of major difficulties. The powdered catalyst together with reaction products have formed a steadily increasing solid body from the bottom of the reactor upwardly, leaving only a small central opening for the incoming fresh feed. Such solid body progressively increases during operating time and has been known to form a partial plug which causes severe channeling or a complete plug which results in a shutdown of the unit.

In addition to inlet and grid fouling by accumulation of deposits, erosion of grid orifices or inlet conduit is severe. This is probably caused by the fluctuations of the lower boundary of the turbulent zone to points within and below the grid or contactor inlet. Frequently these two effects combine so that accumulations occur in one region while erosion accelerated by increased local turbulence and pressure drop occur in another.

Inasmuch as the total mass of effective active catalyst is reduced by catalyst accumulation and channeling, the efficiency of the overall conversion is greatly decreased and local overheating occurs. These effects apparently arise because the fresh feed coming into the reactor ordinarily is suddenly expanded from the volume of the feed line to the volume of the reactor in a fluctuating and turbulent manner.

These difficulties are especially pronounced in hydrocarbon synthesis reactors. For example, in a process for synthesis of hydrocarbons by the exothermic reaction of carbon monoxide and hydrogen in the presence of finely divided iron catalyst, the heat transfer coefficient in a fluidized bed of iron catalyst is initially near 100 B. t. u./sq. ft./hr. However, the formation of a film or layer of catalyst and reaction product near the inlet of the contactor results in very poor transfer of heat at points when it is needed most. With the resultant increase in temperature adjacent the inlet, a steadily increasing solid body forms from the bottom of the reactor up, leaving only a small opening for the incoming feed. Because this solid body is increasing with continuing operating time, it progressively reduces the original total mass of active catalyst and makes temperature control very poor. This results in undesirable synthesis products and shortened catalyst life.

This invention has for a principal object the elimination of plugs and deposits, particularly at the inlet of a fluidized catalyst reactor. An important additional object is the provision of method and means for introducing gasiform fluids uniformly across the entire flow area of a contacting chamber. Another object is to provide method and means for supplying gasiform fluids to the lower portion of a contacting chamber containing suspended finely divided solid contacting material. A further object is to provide a contacting chamber which permits effective and controlled contact of finely divided solids and gasiform fluids. A more specific object of the invention is to provide an improved reaction chamber for the reduction of carbon oxides in the synthesis of hydrocarbons which affords improved means for supplying reactants to a fluidized body of finely divided iron catalyst and for maintaining effective heat transfer from such a fluidized bed. Other objects will become apparent as the detailed description of my invention proceeds.

Briefly, by my invention I attain these objects and eliminate the described difficulties by providing a tapered or inverted conical section containing a plurality of streamlined radial fins to produce laminar and evenly distributed flow over the total cross-sectional area of the contactor. This result is obtained by maintaining the free cross-sectional area of the finned section relatively constant and approximately equal to the cross-sectional area of the inlet line. Thus the total cross-sectional area of the fins is gradually varied in the tapered section so that the cross-sectional area of the flow passages is relatively constant. When a single tapered section is used the top cross-sectional area (passages and fins) of tapered section may equal area of the contacting chamber. The inwardly extending radial fins terminate above the upper level of the inverted conical expander section, the surfaces of the fins converging in a smooth curve at a height approximately equal to about one-third to about one-half the length of the tapered section. In this zone immediately above the tapered section, the gasiform fluid being introduced into the chamber is expanded with turbulent flow accompanied by a pressure drop. Thus the interface between the laminar flow in the conical section and the turbulent zone is located wholly above the tapered section.

In general, it is preferred that the maximum diameter of each tapered section be at least about 1.5 inches and not more than 3 to 5 inches. The taper of the sections should be at least equal to the angle of repose of the fluidized finely divided solid and preferably from about 50° to 70°, for example about 60°. For contactors with a diameter over about 5 inches a manifold of tapered sections may be used. Such a manifolded array may comprise a plurality of symmetrically arranged inverted conical or inverted pyramidal sections or combinations thereof.

Figure 2:
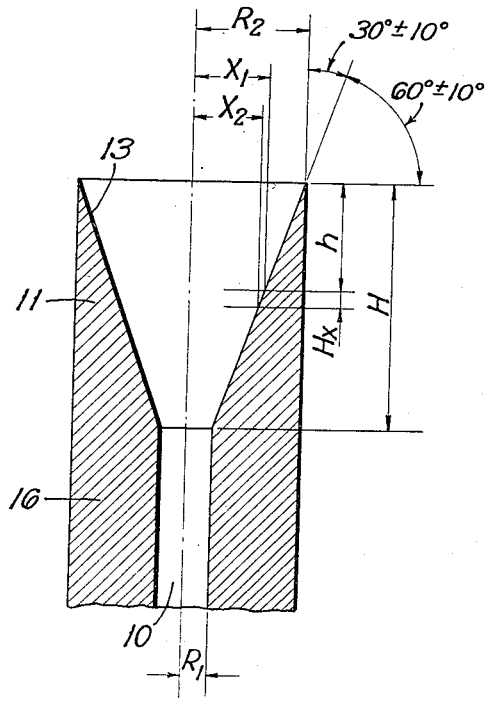

Other details of construction and configuration of the apparatus will be apparent from the following description taken with the accompanying drawings wherein:

Figure 1 is a vertical section of a segment of a reactor employing my feed expander means;

Figure 2 is a section of the tubular inlet having an upper inverted conical expander section with some parts removed; and Figures 3 through 6 are sections taken along the lines 3—3, 4—4, 5—5, and 6—6, respectively, in Figure 1.

Referring to the drawings, my apparatus comprises a feed inlet line 10 of radius $R_1$ merging with an inverted conical section 11 which is flared upward and outward to a radius $R_2$. A plurality of baffles 12 are fixed to the conical surface 13 and extend radially inward therefrom as shown in the several views. The baffles 12 converge to define an inner streamlined channel 14 in communication with a plurality of streamlined and flared passages 15 between the baffles 12. A false bottom 16 can be used to define the inlet conduit 10 and the inverted conical section 11 as shown in Figures 1 and 2. This is a preferred arrangement when the reactor 17 comprises a tubular conduit having a cross-sectional area corresponding to the maximum area of the tapered section 11 with the baffles 12 removed.

Figure 6:
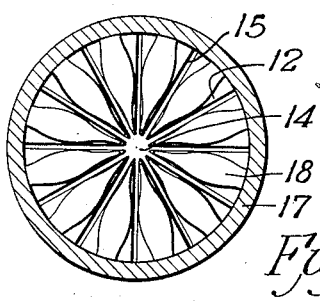
Figure 5:
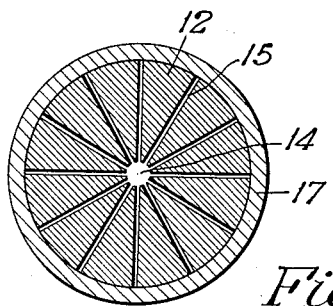
Figure 4:
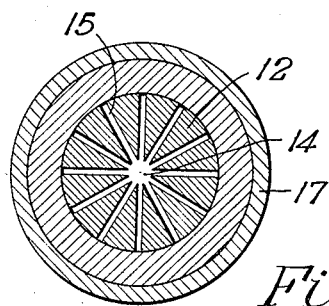
Figure 3:
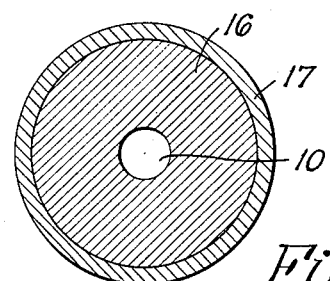

The individual baffles 12 are generally triangular in vertical section when viewed along the line 1—1 of Figure 6 as shown in Figure 1. They may be tack-welded to the surface 13 of the inverted conical member 11 or disposed in slots (not shown) in the surface 13. In any event there are at least three baffles and the baffles are arranged symmetrically about the section 11.

The surfaces of the baffles 12 are bounded by smooth, streamlined curves and with the conical surface 13 of the expander section 11 produce a multiplicity of passages or channels 15 wherein flow is laminar and streamlined until the upper rim of the expander section 11 is reached. The tips or upper portions 18 of the baffles 12 extend above the rim of the section 11 and converge in smooth curves a short distance above the conical section 11 as shown in Figure 1.

The total area of the fins at a given level within the expander section is the difference between the cross-sectional area of the expander section and the area of the inlet line. This can be expressed as follows: $(X_1^2 - R_1^2)\pi$ where $R_1$ is the radius of the inlet conduit and $X_1$ is the radial extent of the baffle at a given level $h$. This value divided by the number of fins, N, defines the area of each fin at the common level.

The arrangement and configuration of the baffles 12 is such that at any level 3—3, 4—4, and 5—5, or any intermediate level, the area occupied by the baffles 12 is defined by the formula set forth above. Likewise, the total area of the passages 15 and the channel 14 at a common level is equal to the area of the inlet line 10. In Figure 2 I have designated portions thereof by reference characters which represent dimensions as used in the above formula.

In the zone 19 of the reactor 17 immediately above the rim of the conical section 11 and within which the tips 18 of the baffles 12 extend, there is turbulent flow of gasiform fluid although the flow is streamlined and laminar through the expander section 11. This turbulent zone serves to support the finely divided solids in a superposed suspended dense phase.

An embodiment of an apparatus employing the finned tapered section according to my invention has been used in connection with a hydrocarbon synthesis reactor containing iron synthesis catalyst and comprising a reactor 17 having a diameter of about 1.7 inches and inlet feed line 10 having a diameter of about 0.55 inch. In this apparatus the expander section 11 was provided with an inverted conical section one inch high and a slope of 30°. There were six streamlined fins 12. The tips 18 at the upper end of the baffles 12 extend about 0.75 inch above the rim of the section 11.

In this reactor the difficulty of catalyst plug formation was eliminated and it was not necessary to employ a separate catalyst supporting grid. Better temperature control was effected and long operating runs have been possible, whereas previously the same reactor with the same feed inlet line could be operated for only limited periods before the plugging difficulty occurred.

Although I have described my invention in terms of specific examples which are set forth in considerable detail, it should be understood that these are by way of illustration only and that the invention is not limited thereto, since alternative embodiments and operating techniques will become apparent to those skilled in the art in view of my disclosure. Accordingly, modifications of my invention are contemplated without departing from the spirit of the described invention or the scope of the appended claims.

I claim:

1. In a vessel for contacting a mass of finely divided solid material with an upwardly moving gasiform fluid in which said solid material is suspended in a fluidized dense phase within said vessel, the apparatus which comprises conduit means for introducing said fluid into said vessel through a central channel extending into the bottom thereof, said conduit means being of generally circular cross section and having a vertically disposed axis, an inverted conical section merging said conduit means with the full flow area of said vessel, the sides of said section having an inclinaiton of between about 20 degrees and 40 degrees, a plurality of peripherally mounted radial ribs within said section, said ribs being streamlined and progressively increasing in horizontal cross section toward the base of said vessel, said inwardly extending radial ribs terminating short of the central axis of said section to produce a central unobstructed flow channel within said section, a plurality of radially extending channels between said radially extending ribs and in communication with said central channel for the passage of solids and gasiform fluids, said channels being of uniform width from the center of the section to the periphery of the section at any given horizontal section, said ribs being so shaped and arranged that at any point within the conical section the total free cross-sectional flow area of said central channel and the radially extending channels is approximately equal to the cross-sectional flow area of the said conduit means whereby laminar and evenly distributed flow is produced over the total cross-sectional flow area of the conical section and whereby the rate of flow through the uniform radial channels is approximately the same as the rate of flow through said conduit means, and extensions of said ribs protruding above the upper edge of the inverted conical section into the vessel thereabove, said extensions sloping inwardly and upwardly from the peripheral wall of said vessel and individually converging progressively in a smooth curve to produce a zone of considerable turbulence immediatley adjacent the outlet of said conical section.

2. The apparatus of claim 1 which includes at least three peripherally mounted radial ribs arranged symmetrically within said conical section, said ribs protruding above the upper edge of said conical section a distance approximately equal to about one-third to about one-half the height of the conical section.

References Cited in the file of this patent

UNITED STATES PATENTS

| Number | Name | Date |
|---|---|---|
| 2,343,560 | Klein | Mar. 7, 1944 |
| 2,608,474 | Gilliam | Aug. 26, 1952 |